(12) United States Patent
Kim

(10) Patent No.: US 9,491,335 B2
(45) Date of Patent: Nov. 8, 2016

(54) CAMERA MODULE

(71) Applicant: LG INNOTEK CO., LTD., Seoul (KR)

(72) Inventor: Hack Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/355,297

(22) PCT Filed: Oct. 11, 2012

(86) PCT No.: PCT/KR2012/008248
§ 371 (c)(1),
(2) Date: Apr. 30, 2014

(87) PCT Pub. No.: WO2013/065960
PCT Pub. Date: May 10, 2013

(65) Prior Publication Data
US 2014/0293101 A1    Oct. 2, 2014

(30) Foreign Application Priority Data

Oct. 31, 2011    (KR) .................... 10-2011-0112205

(51) Int. Cl.
| | |
|---|---|
| *H04N 5/225* | (2006.01) |
| *F16F 7/00* | (2006.01) |
| *G03B 17/02* | (2006.01) |
| *G03B 3/10* | (2006.01) |
| *G03B 13/36* | (2006.01) |

(52) U.S. Cl.
CPC ............. *H04N 5/2252* (2013.01); *F16F 7/00* (2013.01); *G03B 3/10* (2013.01); *G03B 17/02* (2013.01); *H04N 5/2253* (2013.01); *H04N 5/2254* (2013.01); *H04N 5/2257* (2013.01); *G03B 13/36* (2013.01)

(58) Field of Classification Search
CPC ............ H04N 5/2253; H04N 5/2257; H04N 5/2254; F16F 7/12–7/123; F16F 7/125; F16F 7/00
See application file for complete search history.

(56) References Cited

U.S. PATENT DOCUMENTS

| | | | | |
|---|---|---|---|---|
| 2002/0167183 | A1* | 11/2002 | Shimotsu | F16F 7/125 293/132 |
| 2003/0112364 | A1* | 6/2003 | Tanida | H04N 5/2257 348/375 |
| 2004/0061799 | A1* | 4/2004 | Atarashi et al. | 348/340 |
| 2004/0258405 | A1 | 12/2004 | Shiratori et al. | |
| 2006/0291853 | A1* | 12/2006 | Lee et al. | 396/529 |
| 2008/0252775 | A1 | 10/2008 | Ryu et al. | |
| 2009/0174197 | A1* | 7/2009 | Pascual Barrio | B60R 19/34 293/102 |
| 2009/0290061 | A1 | 11/2009 | Choi et al. | |
| 2011/0122267 | A1 | 5/2011 | Ahn et al. | |
| 2012/0236248 | A1* | 9/2012 | Kang | G02B 7/022 349/200 |

OTHER PUBLICATIONS

International Search Report in International Application No. PCT/KR2012/008248, filed Oct. 11, 2012.

* cited by examiner

*Primary Examiner* — Paul Berardesca
(74) *Attorney, Agent, or Firm* — Saliwanchik, Lloyd & Eisenschenk

(57) ABSTRACT

The present invention relates to a camera module, the camera module including a PCB (Printed Circuit Board) mounted with an image sensor, an auto focusing unit installed thereinside with at least one lens and fixed at an upper side of the PCB for auto focusing a focus of an image transmitted to the image sensor, a shield can formed with a through hole at a position corresponding to that of the lens and so formed as to wrap the PCB and the auto focusing unit as well, and a shock absorber installed at an upper circumference of the shield can to form a buffer space between the shield can and the auto focusing unit.

11 Claims, 1 Drawing Sheet

CAMERA MODULE

CROSS-REFERENCE TO RELATED APPLICATIONS

This application is the U.S. national stage application of International Patent Application No. PCT/KR2012/008248, filed Oct. 11, 2012, which claims priority to Korean Application No. 10-2011-0112205, filed Oct. 31, 2011, the disclosures of each of which are incorporated herein by reference in their entirety.

TECHNICAL FIELD

The teachings in accordance with exemplary embodiments of this invention relate generally to a camera module.

BACKGROUND ART

Generally, a digital camera module photographs an image using an image sensor such as a photoelectric conversion device of a CCD (Charge Coupled Device) type or a CMOS (Complementary Metal Oxide Semiconductor) type to replace a film.

A camera module using an image sensor is less voluminous and excellent in performance and used in various fields such as mobile devices, monitoring cameras and detecting cameras mounted on a vehicle capable of photographing an image. Particularly, the trend is that a camera module used for a mobile device is gradually multi-functional, miniaturized and light-weighted.

Recently, a camera module used for mobile devices is equipped with an auto-focusing function, and devices forming the camera module must comply with demand for miniaturization of camera module in association with miniaturization of lens and improvement in optical performances. A driving device such as a VCM (Voice Coil Motor) is used for auto focusing function, where the VCM performs the auto focusing function by vertically moving a lens within a predetermined size of space.

DISCLOSURE OF INVENTION

Technical Problem

Accordingly, an object of the present invention is to provide a camera module configured to minimize a damage caused by shocks by improving structure thereof.

Solution to Problem

In order to accomplish the above object, the present invention provides a camera module, the camera module comprising: a PCB (Printed Circuit Board) mounted with an image sensor; an auto focusing unit installed thereinside with at least one lens and fixed at an upper side of the PCB for auto focusing a focus of an image transmitted to the image sensor; a shield can formed with a through hole at a position corresponding to that of the lens and so formed as to wrap the PCB and the auto focusing unit as well; and a shock absorber installed at an upper circumference of the shield can to form a buffer space between the shield can and the auto focusing unit.

In some exemplary embodiments, the shock absorber may include a first shock absorber having a first height, a second shock absorber having a second height and arranged at an upper side of the first shock absorber, wherein the first and second shock absorbers are mutually connected by bending the upper circumference of the shield can in the shape of a stair.

In some exemplary embodiments, the shock absorber may include a first shock absorber having a first height, a second shock absorber having a second height and arranged at an upper side of the first shock absorber, a third shock absorber having a third height and matching to an upper side of the second shock absorber, wherein the first, second and third shock absorbers are mutually connected by bending the upper circumference of the shield can in the shape of a stair.

In some exemplary embodiments, the shock absorber may be formed at the upper circumference of the shield can in any one form of a round shape or a chamfer shape.

In some exemplary embodiments, a sill unit between the first and second shock absorbers and a sill unit between the second and third shock absorbers may be rounded at each distal end thereof.

In some exemplary embodiments, the shield can may be formed with a press workable metal material.

In some exemplary embodiments, the through hole may be discretely arranged at a predetermined distance to prevent the auto focusing unit from being closely contacted by an inner surface of the auto focusing unit.

Advantageous Effects of Invention

A camera module according to some exemplary embodiments of the present invention has an advantageous effect in that a shape of an upper side of a shield can receiving a frequent shock is improved by being provided with a buffer space for absorbing an amount of shock received by the shield can in a case there occurs an external shock and a deformation resultant therefrom, to minimize the amount of shock transmitted to a VCM installed at an inside of the shield can.

BEST MODE FOR CARRYING OUT THE INVENTION

Now, the camera module according to exemplary embodiments of the present invention will be described in detail with reference to the accompanying drawings.

Figure 1:
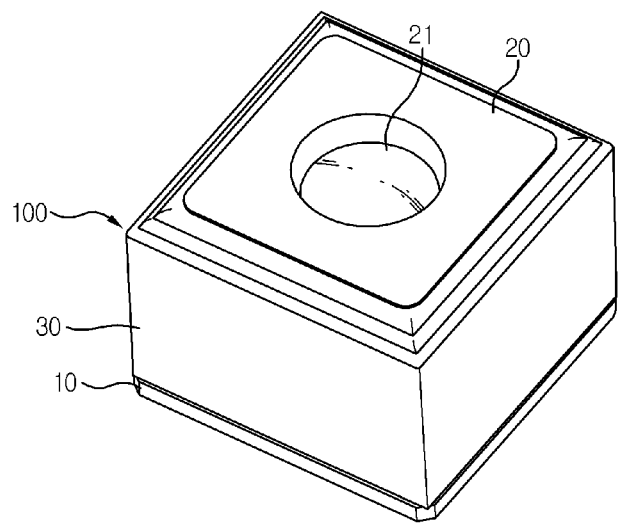
FIG. 1 is a perspective view illustrating a camera module according to an exemplary embodiment of the present invention.
Figure 2:
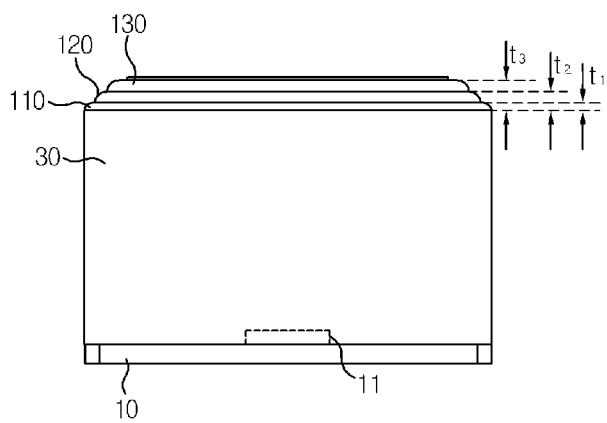
FIG. 2 is a lateral view of FIG. 1.

FIG. 1 is a perspective view illustrating a camera module according to an exemplary embodiment of the present invention, and FIG. 2 is a lateral view of FIG. 1.

Referring to FIGS. 1 and 2, the camera module includes a PCB (Printed Circuit Board, 10), an auto focusing unit (20) and a shield can (30), where a shock absorber (100) is installed at an upper circumference of the shield can (30).

The PCB (10) is mounted at an upper surface thereof with an image sensor (11), where

MODE FOR THE INVENTION

Furthermore, the shield can (30) may be formed with a through hole at a position opposite to one or more sheets of lenses (21) arranged in correspondence to the image sensor (11). At this time, an inner circumferential surface of the through hole is so installed as to maintain a gap to prevent from being closely contacted to an uppermost end of the auto focusing unit (20).

The shock absorber is formed at an upper circumference of the shield can (30) to form a buffer space between the shield can (30) and the auto focusing unit (30), and preferably includes first, second and third shock absorbers (110, 120, 130) according to the exemplary embodiment of the present invention. At this time, the first, second and third shock absorbers (110, 120, 130) may be integrally formed with the shield can (30). It is also possible to form the first shock absorber (110) only, or to form first and second shock absorbers (110, 120), or to form second and third shock absorbers (120, 130).

Furthermore, each corner of the shock absorbers may be formed in any press workable shape such as a round shape or a chamfer shape, but is not limited thereto as long as the shape has an effect of dispersing shocks.

The first shock absorber (110) is formed at an extreme upper end position of the shield can (30) to have a first height (t1) by bending an upper corner of the shield can (30). A width of the first shock absorber (110) corresponds to that of the shield can (30). The first shock absorber (110) may be formed at an entire circumference of an upper end surface of the shield can (30), and may also be formed at a part of the circumference of the upper end surface of the shield can (30). The first shock absorber (110) is preferably distanced from the auto focusing unit (20) as much as the first height (t1).

The second shock absorber (120) is arranged at an upper side of the first shock absorber (110) at an upper end of the shield can (30). According to an exemplary embodiment of the present invention, the second shock absorber (120) is connected, by being bent in a stair shape, to the first shock absorber (110) at a predetermined section, as shown in FIG. 2, and protrusively formed to an upper side to have a second height (t2) from a reference surface of the first shock absorber (110).

The third shock absorber (130) is arranged at an upper side of the second shock absorber (120) at an upper side of the shield can (30).

According to an exemplary embodiment of the present invention, the third shock absorber (130) is connected, by being bent in a stair shape, to the second shock absorber (110) at a predetermined section, as shown in FIG. 2, and protrusively formed to an upper side to have a third height (t3) from a reference surface of the first shock absorber (110).

Width of the first shock absorber (110) may be greater than that of the second shock absorber (120), and width of the second shock absorber (120) may be greater than that of the third shock absorber (130), whereby a corner portion of the shield can (30) may be provided in a stair shape.

Meanwhile, a sill unit between the first and second shock absorbers (110, 120), and a sill unit between the second and third shock absorbers (120, 130) may be processed in a round shape at each tip end thereof.

The camera module according to an exemplary embodiment of the present invention as noted from the foregoing is configured such that each of the stair shaped sill units of the first, second and third shock absorbers (110, 120, 130) is formed at an upper edge of the shield can (30) to form a buffer space between an upper end portion of the shield can (30) and an upper side of the auto focusing unit (20), whereby shock transmitted to the shield can (30) can be prevented from being directly transmitted to the auto focusing unit (20).

Furthermore, in a case a plurality of shock absorbers (110, 120, 130) is formed at an edge portion of the shield can (30), it is possible to form a shield can (30) having a relatively higher strength, as compared to formation of one shock absorber or formation of an angled edge without a shock absorber.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to the present invention has an industrial applicability in that it can be applied to a small-sized camera module mounted on a small electronic device such as a portable terminal, and a tablet PC.

The invention claimed is:

1. A camera module, the camera module comprising:
   a printed circuit hoard (PCB) mounted with an image sensor;
   an auto focusing unit automatically focusing a focus of an image transmitted to the image sensor;
   a shield can disposed on the PCB and outside of the auto focusing unit; and
   a shock absorber integrally formed at an upper surface of the shield can,
   wherein the shock absorber is declined toward a lateral surface of the shield can, and
   wherein at least a portion of the auto focusing unit is upwardly protruded from the upper surface of the shield can; and
   wherein the shock absorber includes a first shock absorber having a first height, and a second shock absorber having a second height different from the first height and arranged at an upper side of the first shock absorber.

2. The camera module of claim 1, wherein the auto focusing unit is installed with at least one lens.

3. The camera module of claim 1, wherein the auto focusing unit is installed inside the shield can.

4. The camera module of claim 1, wherein the shield can is formed with a through hole at a position corresponding to a through hole of the auto focusing unit.

5. The camera module of claim 1, wherein the shock absorber is formed at an upper circumference of the shield can.

6. The camera module of claim 1, wherein the first and second shock absorbers are connected by bending the upper circumference of the shield can.

7. The camera module of claim 1, wherein the shock absorber further includes a third shock absorber having a third height and arranged at an upper side of the second shock absorber, wherein the first, second and third shock absorbers are connected by bending the upper circumference of the shield can.

8. The camera module of claim 1, wherein the shock absorber includes a portion of a round shape.

9. The camera module of claim 1, wherein the shock absorber comprises a plurality of steps.

10. The camera module of claim 7, wherein the first shock absorber includes a portion of a round shape.

11. The camera module of claim 1, wherein the shield can is formed with a press workable metal material.

* * * * *